US011713725B2

(12) United States Patent
Angello et al.

(10) Patent No.: US 11,713,725 B2
(45) Date of Patent: Aug. 1, 2023

(54) LEAN BLOWOUT PRECURSOR DETECTION FOR GAS TURBINES

(71) Applicant: Electric Power Research Institute, Inc., Palo Alto, CA (US)

(72) Inventors: Leonard Charles Angello, Mountain View, CA (US); David Robert Noble, Catawba, NC (US); Andrew Mueller, Bakersfield, CA (US); John Alexander Miltner, Smyrna, GA (US); Benjamin Emerson, Peachtree City, GA (US); Scott Sheppard, Mountain View, CA (US); Jared Kee, Marietta, GA (US); Timothy Charles Lieuwen, Atlanta, GA (US)

(73) Assignee: Electric Power Research Institute, Inc., Palo Alto, CA (US)

( * ) Notice: Subject to any disclaimer, the term of this patent is extended or adjusted under 35 U.S.C. 154(b) by 480 days.

(21) Appl. No.: 16/885,541

(22) Filed: May 28, 2020

(65) Prior Publication Data

US 2021/0372330 A1    Dec. 2, 2021

(51) Int. Cl.
*F02C 9/50* (2006.01)
*G01D 3/08* (2006.01)
(Continued)

(52) U.S. Cl.
CPC .................. *F02C 9/50* (2013.01); *G01D 3/08* (2013.01); *G01D 21/02* (2013.01); *G01H 1/12* (2013.01);
(Continued)

(58) Field of Classification Search
CPC .... F23N 5/242; F23N 5/16; F02C 9/26; F02C 9/50; F02C 7/262; F05D 2220/32;
(Continued)

(56) References Cited

U.S. PATENT DOCUMENTS 7,089,746 B2    8/2006   Lieuwen et al.
7,454,892 B2   11/2008   Lieuwen et al.
(Continued)

FOREIGN PATENT DOCUMENTS

EP    1445450 A1    8/2004
EP    1662116 A1    5/2006
(Continued)

OTHER PUBLICATIONS

International Search Report for Application No. PCT/US2020/033320 dated Oct. 2, 2020.
(Continued)

*Primary Examiner* — Craig Kim
(74) *Attorney, Agent, or Firm* — Curatolo Sidoti & Trillis Co., LPA; Floyd Trillis, III; Salvatore A Sidoti

(57) ABSTRACT

A method for detecting blowout precursors in at least one gas turbine combustor comprising: receiving combustion dynamics acoustic data measured by an acoustic measuring device associated with the combustor in real time; performing wavelet analysis on the acoustic data using simplified Mexican Hat wavelet transform analysis; and determining the existence of a blowout precursor based at least in part on the wavelet analysis. Provided also is a system and a non-transitory computer readable medium configured to perform the method.

18 Claims, 6 Drawing Sheets

(51) Int. Cl.
*G01H 3/12* (2006.01)
*G01D 21/02* (2006.01)
*G01H 1/12* (2006.01)
*F23N 5/16* (2006.01)
*F23N 5/24* (2006.01)
*G05D 11/02* (2006.01)
*G01H 9/00* (2006.01)

(52) U.S. Cl.
CPC ............ *G01H 3/12* (2013.01); *F05D 2220/32* (2013.01); *F05D 2240/35* (2013.01); *F05D 2260/80* (2013.01); *F05D 2260/821* (2013.01); *F05D 2270/092* (2013.01); *F05D 2270/333* (2013.01); *F05D 2270/44* (2013.01); *F05D 2270/71* (2013.01); *F05D 2270/80* (2013.01); *F05D 2270/81* (2013.01); *F23N 5/16* (2013.01); *F23N 5/242* (2013.01); *G01H 9/002* (2013.01); *G05D 11/02* (2013.01)

(58) Field of Classification Search
CPC ........... F05D 2240/35; F05D 2270/333; F05D 2270/44; F05D 2270/71; F05D 2270/80; F05D 2270/81; F23D 2206/10; G01D 3/08; G01D 21/02
See application file for complete search history.

(56) References Cited

U.S. PATENT DOCUMENTS

| | | | |
|---|---|---|---|
| 9,752,960 B2 | 9/2017 | Angello et al. | |
| 2005/0056024 A1* | 3/2005 | Lieuwen | F23M 11/045 60/779 |
| 2006/0090471 A1 | 5/2006 | Shah et al. | |
| 2006/0137353 A1* | 6/2006 | Lieuwen | F23N 5/242 60/803 |
| 2006/0201158 A1* | 9/2006 | Venkateswaran | F01D 17/085 60/39.24 |
| 2009/0005952 A1 | 1/2009 | Tonno et al. | |
| 2010/0076698 A1 | 3/2010 | He et al. | |
| 2012/0275899 A1 | 11/2012 | Chandler | |
| 2016/0273767 A1 | 9/2016 | Unni et al. | |
| 2017/0356349 A1* | 12/2017 | Jiang | F01D 21/003 |
| 2018/0073970 A1 | 3/2018 | Hagen | |
| 2018/0328817 A1 | 11/2018 | Andrews et al. | |
| 2020/0355368 A1 | 11/2020 | Angello et al. | |
| 2020/0408639 A1 | 12/2020 | Angello et al. | |
| 2021/0372330 A1* | 12/2021 | Angello | F02C 9/50 |
| 2022/0275759 A1* | 9/2022 | Fetvedt | F02C 7/264 |

FOREIGN PATENT DOCUMENTS

| | | | |
|---|---|---|---|
| EP | 3531019 A1 | 8/2019 | |
| KR | 20130092749 A | 8/2013 | |
| WO | 2020231885 A1 | 11/2020 | |
| WO | 2020263453 A1 | 12/2020 | |
| WO | WO-2021240485 A1 * | 12/2021 | ............... F02C 9/50 |

OTHER PUBLICATIONS

Written Opinion of the International Searching Authority for Application No. PCT/US2020/033320 dated Oct. 2, 2020.
International Search Report for Application No. PCT/US2020/032276 dated Aug. 26, 2020.
Written Opinion of the International Searching Authority for Application No. PCT/US2020/032276 dated Aug. 26, 2020.
International Search Report for Application No. PCT/IB2021/054893 dated Sep. 17, 2021.
Written Opinion of the International Searching Authority for Application No. PCT/IB2021/054893 dated Sep. 17, 2021.
Suraj Nair, Acoustic Characterization of Flame Blowout Phenomenon, Dissertation, Georgia Institute of Technology, May 2006.

* cited by examiner

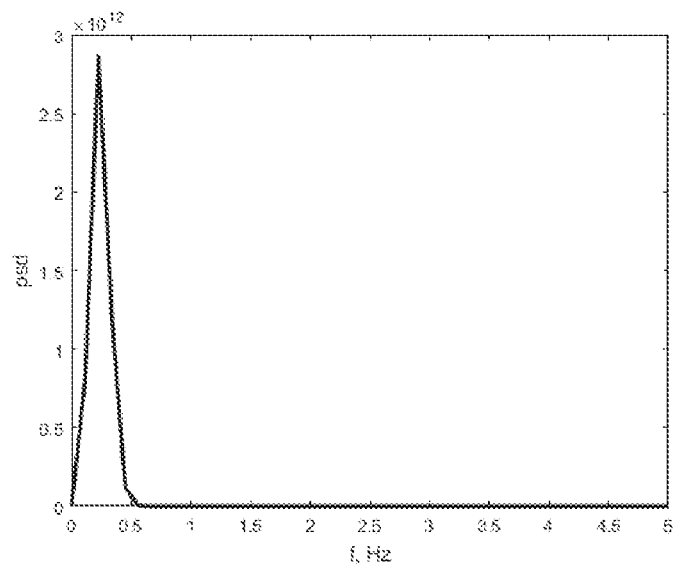
Fig. 3
Fig. 4a
Fig. 4b
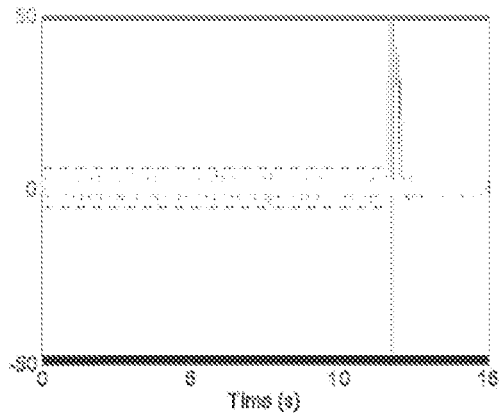
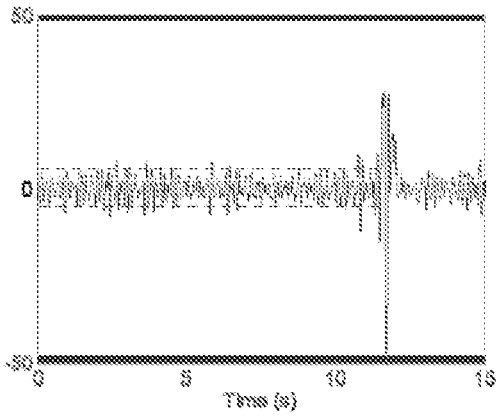

LEAN BLOWOUT PRECURSOR DETECTION FOR GAS TURBINES

Gas turbines have become a key technology for new power generating capacity in the United States and worldwide due to higher operating efficiencies and fewer pollutant emissions when compared to traditional power generation systems. Tightened emissions targets and the need for improved fuel efficiency and reliability have increased the level of technology in today's gas turbine engines.

In typical gas turbine engines, air is compressed and forced through a combustion area, where one or more fuel injectors provides a stream of fuel to be combusted by the high pressure air in a "can" annular flame holder. Such gas turbines may have firing temperatures in excess of 2000° F. The exhaust gases then drive a turbine to ultimately generate power.

Gas turbine engine pollutant emissions such as NOx may be reduced by utilizing very lean fuel-air mixtures, however, this causes increased combustion instability in the gas turbine.

If the gas turbine is operated under conditions where the ratio of fuel to air is insufficient to maintain a flame in the can, the flame will be extinguished (referred to as lean blowout) and the engine may need to be restarted.

Due to present day NOx regulations, many gas turbines operate on very thin margins (fuel-air ratios) with respect to lean blowout (LBO), and LBO onset to flameout can happen within milliseconds. When certain operating profiles are implemented with certain gas turbine models, blowout occurs without warning and without mitigation by the original equipment manufacturer's software.

Provided is a method for analysis of combustion dynamics data and operational data leading to or associated with lean blowout (LBO) events. Combustion dynamics may be pressure waves of defined amplitudes and frequencies that are associated with the natural acoustic modes of the combustion system. In the typical can-annular combustor of a large gas turbine, combustion dynamics may range in frequency from less than 50 Hz to several 1000 Hz. The subject analysis identifies specific signals in the gas turbine operational data that indicate the onset of LBO.

Use of the method may permit improvement of operational flexibility of the gas turbine, reduction of power generation operating cost, and/or reduction of the risk of a power interruption due to emission compliance.

The subject method utilizes a computer algorithm that analyzes combustion dynamics data (time-series data) real-time. The algorithm convolves the time series data with a Mexican Hat wavelet basis. The result of the convolution is referred to as a time-dependent wavelet coefficient. The wavelet time scales are set in order to search for high frequency (kilohertz rate) temporal oscillations in the combustion dynamics data. This is unlike known techniques, which search for low frequency dynamics.

This method is also unlike other known techniques because it simplifies the wavelet convolution. These simplifications reduce the number of dimensions of the convolution, which saves computational expense so that the algorithm can be implemented quickly for fast detection, as discussed herein below.

Implementation of this algorithm requires data acquisition systems that are capable of sampling rates in the tens of kilohertz. Wavelet coefficients that exceed a threshold are interpreted as blowout precursors. These precursors indicate that there is insufficient blowout margin in the combustor that produced the precursor.

Gas turbines can be operated at very low power levels where blowout poses substantial risk. The subject method reduces risk of blowout at such conditions by a) providing active monitoring against impending blowout, and b) enabling counter-blowout tuning by providing feedback about the combustors that pose the greatest blowout risk.

Other variations of the algorithm have been explored, for example using Fast Fourier Transforms, but their implementation was insufficiently fast for real-time monitoring.

Embodiments of the subject matter are disclosed with reference to the accompanying drawings and are for illustrative purposes only. The subject matter is not limited in its application to the details of construction or the arrangement of the components illustrated in the drawings. As used herein, "at least one" means one or more than one, and "and/or" means items listed may be included exclusively or in combination.

BRIEF DESCRIPTION OF THE DRAWINGS

FIG. 3 is a graphical representation of a spectrum of the wavelet basis shown in FIG. 2.

FIGS. 4a and 4b are graphical representations of a comparison of time-dependent wavelet coefficients for cases with a) an acoustic "event" but no LBO, and b) LBO. Reference lines are provided at the same amplitude for both cases.

Figure 1:
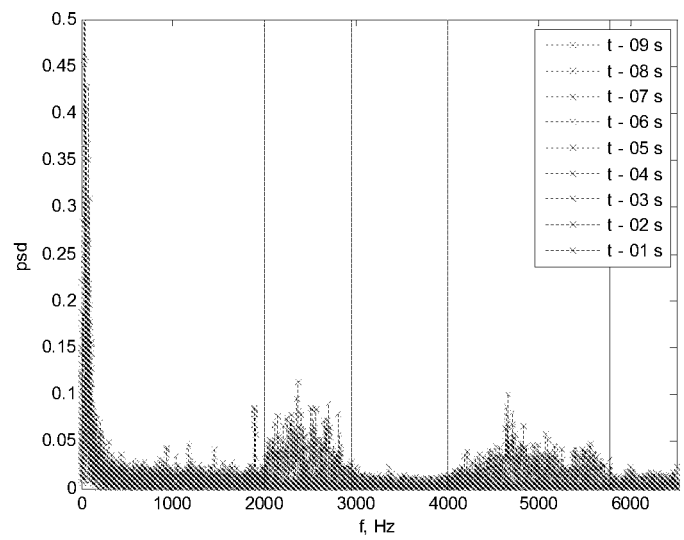
FIG. 1 is a graphical representation (spectrogram) of an overlay of transform coefficient spectra from the last ten seconds before LBO. Reference lines bound the two high frequency regions: one between 2,000 and 3,000, and one between 4,000 and 6,000 Hz.

The following embodiments of the present subject matter are contemplated.

1. A method for detecting blowout precursors in at least one gas turbine combustor, comprising receiving combustion dynamics acoustic data measured by an acoustic measuring device associated with the combustor in real time; performing wavelet analysis on the acoustic data using a simplfied Mexican Hat wavelet transform analysis; and determining the existence of a blowout precursor based at least in part on the wavelet analysis.

2. The method of embodiment 1, wherein said determining the existence of a blowout precursor comprises determining an increase in amplitude of time dependent spectral content in at least one predefined band of high frequency dynamics.

3. The method of embodiment 2, wherein the band of high frequency dynamics is predefined based on an identification of bands of high frequency dynamics that appeared for the same combustor approximately one second before a previous blowout event.
4. The method of any one of embodiments 1 to 3, wherein performing the wavelet analysis comprises determining the dominant frequencies of oscillation of an acoustic data signal as a function of time to calculate a wavelet coefficient.
5. The method of embodiment 4, further comprising using a windowed root-mean-square calculation to process the wavelet coefficient to determine the amplitude of the wavelet coefficient, and determining the existence of a blowout precursor based on an increased amplitude of the wavelet coefficient oscillation.
6. A system for acoustic detection of blowout precursors in at least one gas turbine combustor comprising an acoustic measuring device in communication with the combustor, wherein the acoustic measuring device generates signals indicative of acoustic combustion dynamics in the combustor in real time; and a blowout precursor monitoring unit that receives the acoustic signals and performs a simplified Mexican Hat wavelet transform analysis to detect the existence of a blowout precursor.
7. The system as in embodiment 6, further comprising a combustion controller configured to control at least one parameter of the operation of the combustor based at least in part on detection of a blowout precursor by the blowout precursor monitoring unit.
8. The system as in embodiment 7, wherein the combustion controller is configured to generate at least one control signal upon detection of a blowout precursor to adjust a fuel-air ratio of fuel and air supplied to the combustor associated with the blowout precursor.
9. The system of any one of embodiments 6 to 8, wherein the blowout precursor monitoring unit detects the existence of a blowout precursor by determining an increase in amplitude of time dependent spectral content in at least one predefined band of high frequency dynamics.
10. The system of embodiment 9, wherein the at least one band of high frequency dynamics is predefined based on an identification of bands of high frequency dynamics that appeared for the same combustor approximately one second before a previous blowout event.
11. The system of any one of embodiments 6 to 10, wherein the blowout precursor monitoring unit performs the wavelet analysis by determining the dominant frequencies of oscillation of the acoustic signal as a function of time to calculate a wavelet coefficient.
12. The system of embodiment 11, wherein the blowout precursor monitoring unit uses a windowed root-mean-square calculation to process the wavelet coefficient to determine the amplitude of the wavelet coefficient, and detects the existence of a blowout precursor based on an increased amplitude of the wavelet coefficient oscillation.
13. The system of any one of embodiments 6 to 12, wherein the blowout precursor monitoring unit, upon detection of a blowout precursor, sends an alarm signal to an electronic device and/or sends a signal indicating the detection of the blowout precursor to a combustion controller.
14. A non-transitory computer-readable storage medium on which is encoded executable program code for performing a method for detecting blowout precursors in at least one gas turbine combustor comprising, receiving combustion dynamics acoustic data measured by an acoustic measuring device associated with the combustor in real time; performing wavelet analysis on the acoustic data using a simplified Mexican Hat wavelet transform analysis; and determining the existence of a blowout precursor based at least in part on the wavelet analysis.
15. The non-transitory computer readable medium of embodiment 14, wherein said determining the existence of a blowout precursor comprises determining an increase in amplitude of time dependent spectral content in at least one predefined band of high frequency dynamics.
16. The non-transitory computer readable medium of embodiment 15, wherein the band of high frequency dynamics is predefined based on an identification of bands of high frequency dynamics that appeared for the same combustor approximately one second before a previous blowout event.
17. The non-transitory computer readable medium of any one of embodiments 14 to 16, wherein performing the wavelet analysis comprises determining the dominant frequencies of oscillation of an acoustic data signal as a function of time to calculate a wavelet coefficient.
18. The non-transitory computer readable medium of embodiment 17, wherein the method further comprises using a windowed root-mean-square calculation to process the wavelet coefficient to determine the amplitude of the wavelet coefficient, and determining the existence of a blowout precursor based on an increased amplitude of the wavelet coefficient oscillation.

The method begins with combustor acoustic data and utilizes a wavelet-based analysis, constructed to provide computational efficiencies beyond those of traditional Fourier Transform and other wavelet-based analyses, to detect high frequency blowout precursors in the combustion dynamics data, to identify the combustor that is experiencing impending blowout, and to make the detection with sufficient time to detect and react to the precursors. Additionally, the method identifies which combustor(s) have experienced LBO issues in operation, so that corrective tuning of those combustor(s) can be implemented after the fact.

The method may be carried out through the use of a non-transitory computer readable medium on which is encoded executable program code for performing the method, or which comprises instructions configured to be executed by a processor of a system for acoustic detection of blowout precursors in at least one gas turbine combustor, wherein the instructions comprise instructions configured to cause the processor to carry out the steps of the method.

The LBO detection algorithm consists of a wavelet-based analysis. The wavelet analysis is applied to the acoustic data from each combustor in real time. A wavelet analysis allows data analysis in the time and frequency domains simultaneously. Additionally, the wavelet analysis can be applied at select frequencies of interest without wasting computational effort on other frequencies. The output of the wavelet analysis is a vector of time-dependent coefficients for each frequency of interest. The coefficients in each vector represent the acoustic amplitude at that frequency and time. These coefficient's values oscillate around zero, with a peak-to-peak amplitude that is related to the acoustic amplitude. These coefficients are post-processed with a windowed root-mean-square (RMS) calculation in order to "flatten" their oscillatory nature. This RMS value is monitored as an indicator of LBO precursors, with elevated values indicating an impending LBO event.

An initial analysis may be performed to characterize at least one band of high frequency dynamics that commonly appear during the approximately one second before LBO, and less commonly appear before "hiccups", or "near LBO" events. A Fourier analysis is one possible tool for characterization. The wavelet analysis will target these same frequency range(s) but with better temporal resolution and an overall more efficient and faster algorithm.

The purpose of a wavelet transform is to determine the frequency, or spectral content of a signal as a function of time. A signal's spectral content can never be perfectly isolated in time. However, wavelet transforms do a good job of approximating time-dependent spectral content. Wavelets can do this better than conventional Fourier analysis.

The wavelet analysis generally consists of the discrete convolution inner product of a wavelet basis function with a signal. The two wave forms are convolved in time over a brief time window (typically a few periods of oscillation of the basis function), and this convolution is repeated at each time step that the signal is "updated." In other words, the two wave forms are cross-correlated in time at each time step. This identifies "how much" the brief portion of the signal "looks like" the wavelet.

This analysis uses a "Mexican Hat" basis function, which provides a good approximation of the dominant frequencies of oscillation of the signal as a function of time with good temporal resolution. The Mexican Hat basis function is named for the "sombrero" shape of the function. The basis function is plotted in FIG. 2 and its functional form in the variation used herein is expressed in Equation 1. This wavelet offers a good tradeoff between time and frequency isolation.

$$w(t) = \frac{2}{\sqrt{3}\,\pi^{1/4}}\left(1-\left(\frac{t}{\sigma}\right)^2\right)e^{-\frac{t^2}{2\sigma^2}} \quad \text{Equation 1}$$

The wavelet analysis that is used in this algorithm is performed for the dominant frequency for each band of high frequency dynamics selected during characterization. Defined herein as a "simplified wavelet analysis" or a "simplified Mexican Hat wavelet transform analysis", the targeted analysis at only a few frequencies is more efficient than analysis at many frequencies. In certain embodiments, the wavelet analysis that is used in this algorithm may be performed for two frequencies (i.e. two values of $\sigma$).

Additionally, the algorithm performs an inner product between the basis function and a sample of the signal only once per time step; there is no convolution (i.e. no "shifting") of the basis function against the sample. This adds significant computational efficiency. However, this approach produces an oscillatory behavior to the wavelet coefficients which may be handled in post-processing. As the frequency of the signal approaches the frequency of the wavelet basis, the peak-to-peak amplitude of these oscillating wavelet coefficients becomes large. Since the basis function is held stationary and the signal is shifted against the basis with each time step, the period of oscillation of the wavelet coefficients is equal to the period of oscillation of the signal sample. In other words, the wavelet coefficient value repeats every time the signal "looks the same."

A windowed root-mean-square (RMS) is used to post-process the wavelet coefficients. The RMS is proportional to the wavelet coefficient amplitude (A) and peak-to-peak amplitude ($A_{PTP}$) and is related by the following expressions for a sinusoidal oscillation:

Amplitude: RMS=$\sqrt{2}\cdot A$

Peak-to-peak amplitude: RMS=$2\sqrt{2}\cdot A_{PTP}$

This RMS calculation requires at least one period of the frequency of interest to capture amplitude of the wavelet coefficient. For example, if a signal is being investigated for its 1,000 Hz frequency content with a wavelet centered at 1,000 Hz, then an RMS calculation would be required to post-process the wavelet coefficients with a window for the RMS calculation of at least 1 millisecond (calculated as the reciprocal of the frequency).

Thus, the present method is unlike other known techniques because it comprises a simplified wavelet analysis, and simplified wavelet convolution. These simplifications reduce the number of dimensions of the convolution, which saves computational expense so that the algorithm can be implemented quickly for fast detection. Typical wavelet convolutions include a shift of the basis frequency, a shift of the basis phase, and a shift in time of the signal. These simplifications eliminate the basis frequency and phase shifts as follows. The present, subject method formulates the wavelet basis only at one or two pre-determined frequencies instead of sweeping the basis through a broad range of frequencies. The method establishes a basis of constant phase. The end result of the convolution is a wavelet coefficient that oscillates. The method calculates the root-mean-square (RMS) of this oscillating wavelet coefficient to indicate its amplitude.

EXAMPLES

The acoustic "events" without LBO will be referred to herein as "hiccups." The cases used in the experimental method showed a repeatable factor of four difference in wavelet coefficient RMS for the LBO cases versus the hiccups.

The subject method was back-tested on archived combustion dynamics acoustic data from can-annular gas turbines having multiple combustors. In the present test examples the can-annular gas turbines had ten combustors, although the applicability of the method is not limited to that number of combustors, but rather is applicable to use with gas turbines of more or less than ten combustors.

In conducting the back-test of the examples, the characterization Fourier analysis for the gas turbines was performed on combustion dynamics data consisting of 60 second records sampled at 12,500 Hz for each of the ten combustors. The Fourier analysis was conducted by scanning a Fourier transform with a one second window through each of the ten signals. The resulting time-dependent Fourier coefficients were plotted as a function of time and frequency for each combustor. Discrete spectra were plotted and overlaid for each second during the ten seconds leading to LBO. An example spectral overlay is shown in FIG. 1. The figure overlays ten spectra from each of the ten seconds leading up to LBO. At times close to LBO, high frequency dynamics appear in two bands: one near 2,500 Hz, and one near 5,000 Hz. These bands are bounded by the vertical reference lines in FIG. 1. It is noted that the specific target frequencies may vary depending upon the gas turbine equipment in use, and other factors discussed below.

In the example of FIG. 1, two wavelet analyses would be performed, one targeting the frequency 2500 Hz and one targeting the frequency 5000 Hz. A frequency is targeted by adjusting the value of $\sigma$ in Equation 1 to center the peak of the basis function at the desired frequency. This center frequency is roughly related to the scaling parameter by Equation 2.

$$\sigma = \frac{\sqrt{2}}{2\pi f_{center}} \quad \text{Equation 2}$$

Figure 2:
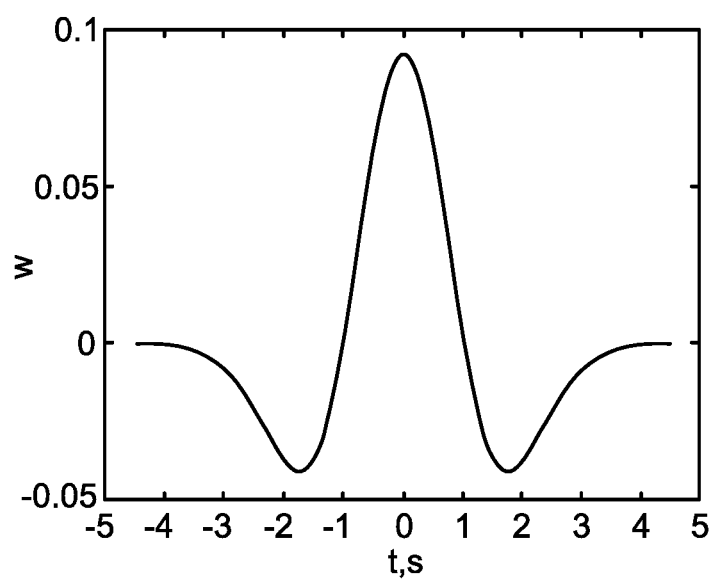
FIG. 2 is a graphical representation of a Mexican Hat basis function, w(t), with $\sigma=1$.

An example of the basis function with σ=1 is shown in FIG. 2. A Fourier analysis spectrum of the basis function is shown in FIG. 3.

FIGS. 4a and 4b compare the wavelet coefficients from two cases, before RMS post-processing: one case with an acoustic event (where the system recovered and there was no LBO), and one case with LBO. A dashed set of reference lines is provided for both cases at the same amplitude to aid comparison. This figure demonstrates two things. First, it demonstrates the oscillatory nature of the wavelet coefficients. Second, it demonstrates an increased amplitude of the wavelet coefficient oscillation preceding LBO.

Figure 5A:
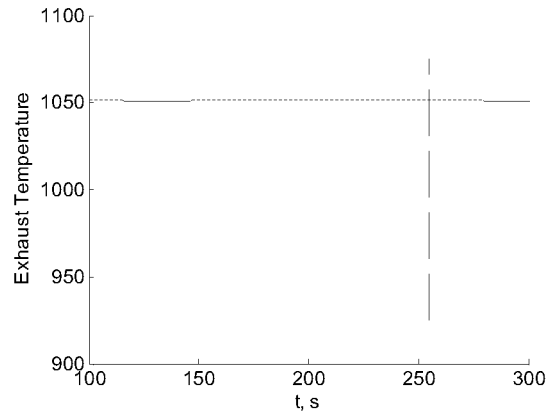
FIGS. 5a and 5b are graphical representations of the average exhaust gas path temperature for the 4a and 4b cases with a) a hiccup (not LBO) and b) the LBO. A dashed line indicates the acoustic event associated with the hiccup or LBO event.
Figure 5B:
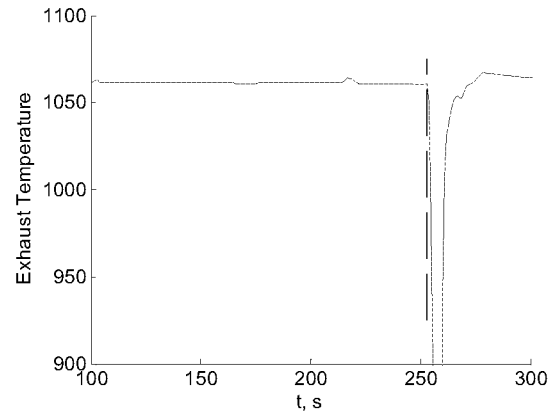

An exhaust gas path analysis was conducted to confirm the absence of LBO for the acoustic "events" without LBO (hiccups). The exhaust gas path analysis for the two cases from FIGS. 4a and 4b are shown in FIGS. 5a and 5b, which are graphical representations of the average exhaust gas path temperature for the case with a) the hiccup and b) the LBO. A dashed line indicates the acoustic event associated with the hiccup or LBO event. The figure shows no temperature disturbance in the case of the hiccup, but in the case of the LBO, the temperature has a dip associated with the LBO and re-ignition.

Figure 6A:
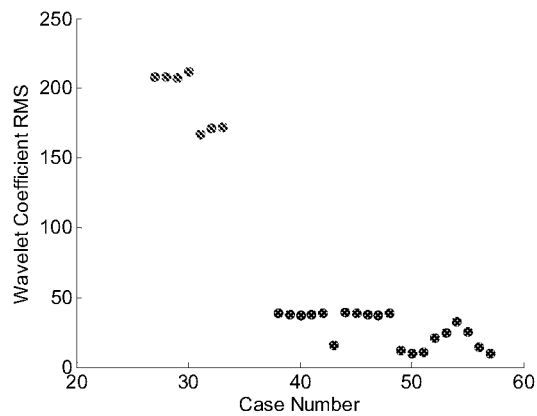
FIGS. 6a and 6b are graphical representations of the RMS of the wavelet coefficient for a) the low frequency wavelet and b) the high frequency wavelet. LBO points appear in the top left portions of the graphs and hiccup points appear in the lower right portions of the graphs.
Figure 6B:
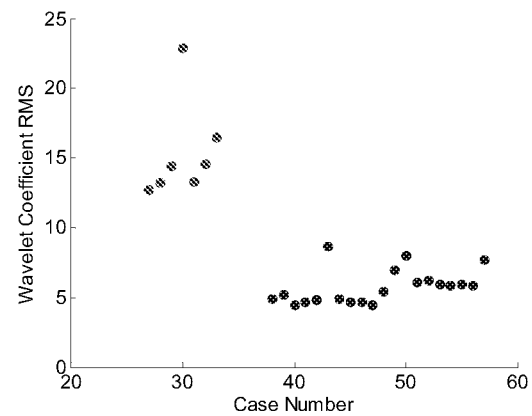

The entire method was back-tested on several sets of historical data, all of which included "acoustic events," some of which were followed by LBO and others that were only hiccups. The results of the back testing are shown in FIGS. 6a (the lower frequency wavelet) and 6b (the higher frequency wavelet), which plot the wavelet coefficient amplitude RMS for each case, with LBO points appearing in the top left portions of the graphs and hiccup points appearing in the lower right portions. FIGS. 6a and 6b show a repeatable factor of four difference in wavelet coefficient RMS for the LBO cases versus the hiccups. It is noted that this factor may vary based upon the particular gas turbine device in use.

High frequency dynamics offer a better prognostication opportunity because many cycles of high frequency oscillation can be observed in a short time relative to low frequency oscillations. Also, the high frequency dynamics do a better job distinguishing "hiccups" from true LBO events.

In certain embodiments, combustion dynamics monitoring systems collect dynamics data in the time domain. Time domain data may comprise pressure oscillations, acoustic data, electromagnetic radiation from the flame (e.g., chemiluminescence or thermal radiation), velocity oscillations, or some other observable related to combustion dynamics. Operational data may also be collected, for example, engine power, inlet guide vane angles, ambient temperature and other operational data. The related data may be acquired from, without limitation, combustion dynamics monitoring systems, other device data collection systems or directly from sensors associated with the devices.

According to certain embodiments, the subject method may comprise receiving real-time combustor fuel split data and fuel gas temperature data. In some embodiments, the fuel gas temperature may be up to about 150° C. In some embodiments, the fuel split may range from 0% to 100% fuel and 0% to 100% air, wherein the combination of fuel and air is 100%. In some embodiments, the method may comprise comparing the real-time combustor fuel split data and fuel gas temperature data with data in a reference database, wherein the reference database comprises at least one data set selected from the group consisting of normalized load data, wheelspace temperature data, compressor discharge temperature data, dynamics amplitude data, and dynamics frequency data.

Wheelspace temperature and compressor discharge temperature may be collected with the use of a thermocouple. Dynamics amplitude and dynamics frequency data may be collected with the use of acoustic sensors or acoustic pressure sensors, and transformed from the time domain to the frequency domain as described above.

The reference database may be configured to be updated by real time combustion dynamics data and fuel split data. According to certain embodiments, data may be streamed to the reference database or uploaded manually via batch upload. In some embodiments, a sliding window of user-defined, variable time determines the relevant values in the reference database as it is updated.

In some embodiments, the non-transitory computer readable medium may comprise instructions for updating a reference database with acoustic data as a function of gas turbine combustion dynamics. According to certain embodiments, the reference database may be updated in real time. The reference database may be included on the same non-transitory computer readable medium or on a separate non-transitory computer readable medium. According to certain embodiments, the reference database is configured to be updated with new data as directed by the user.

According to certain embodiments, the non-transitory computer readable medium may be included in a computer system comprising at least one processor coupled to memory. In some embodiments, a gas turbine system comprising at least one gas turbine may provide data to the computer system comprising the non-transitory computer readable medium. The computer system may be configured to receive data input from at least one acoustic sensor within the gas turbine, and the data input may be performed in real time. The computer system may be configured to receive data input from at least one pressure sensor, and the data input may be performed in real time. The computer system may be configured to receive data input from at least one thermocouple, and the data input may be performed in real time.

As used in this application, the terms "module" and "system" may refer to a computer-related entity, either hardware, a combination of hardware and software, software, or software in execution. A module may, in certain embodiments, include steps or processes performed manually. For example, a module may be, but is not limited to being, a process running on a processor, a processor, an object, an executable, a thread of execution, a program or a computer. By way of illustration, both an application running on a server and the server can be a module. One or more modules may reside within a process and/or thread of execution and a module may be localized on one computer or processor, and/or distributed between two or more computers or processors. The system and method may be implemented for real-time control, for example, using a digital signal processor (DSP) or similar embedded device.

Figure 7:
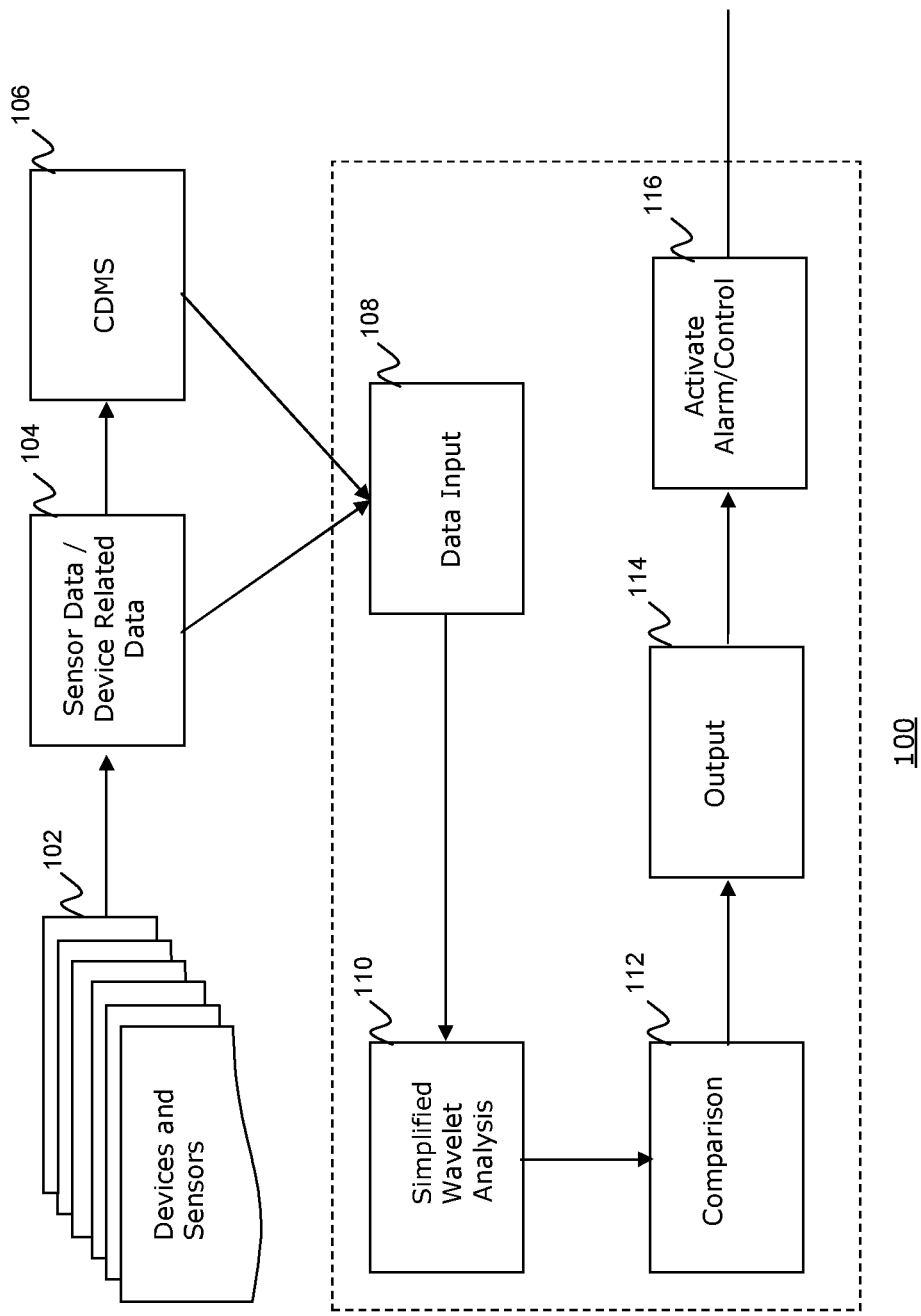
FIG. 7 is a block diagram ustrating certain embodiments of the present method.

The method 100 for detecting blowout precursors is depicted in the block diagram flowchart of FIG. 7. Method 100 receives as data input 108, sensor data and device related data 104 associated with a plurality of gas turbine engine devices and sensors 102. In an embodiment, the sensor data 104 may comprise combustion dynamics data, such as the amplitude and frequency of combustion pressure oscillations in the gas turbine engine, and operational data. It is noted that combustion dynamics are dependent on a significant number of factors. For example, engine make or model, engine power level, ambient temperature, fuel composition, inlet guide vane angle, machine-on time, and a host of other parameters may have an impact on the combustion dynamics data.

The sensors that are useful in the present system and method are those known in the art which are capable of providing a signal representative of combustion dynamics data associated with the operation of a gas turbine device. Conventional sensors which report a signal to a combustion dynamics monitoring system (CDMS) program may be used. The method 100 may receive the sensor data 104 from, for example, a CDMS 106. The method may receive sensor data 104 directly from sensors associated with the devices 102.

Sensor data 104, such as combustion dynamics data in the time domain, is subjected to simplified Mexican Hat wavelet analysis 110 to arrive at a series of wavelet coefficients for, typically, a lower and a higher frequency in the kilohertz range. Both the lower frequency and higher frequency wavelet coefficients are subjected to comparison 113 against previous wavelet coefficient thresholds. If both are above the wavelet coefficient thresholds for the same combustor at the same time, a blowout precursor is identified and an LBO signal is output 114 for that combustor. The LBO signal may be output to activate 116 a warning signal or alarm, or may send an operative signal to a controller to address an operational parameter to avert or respond to an LBO event.

Figure 8:
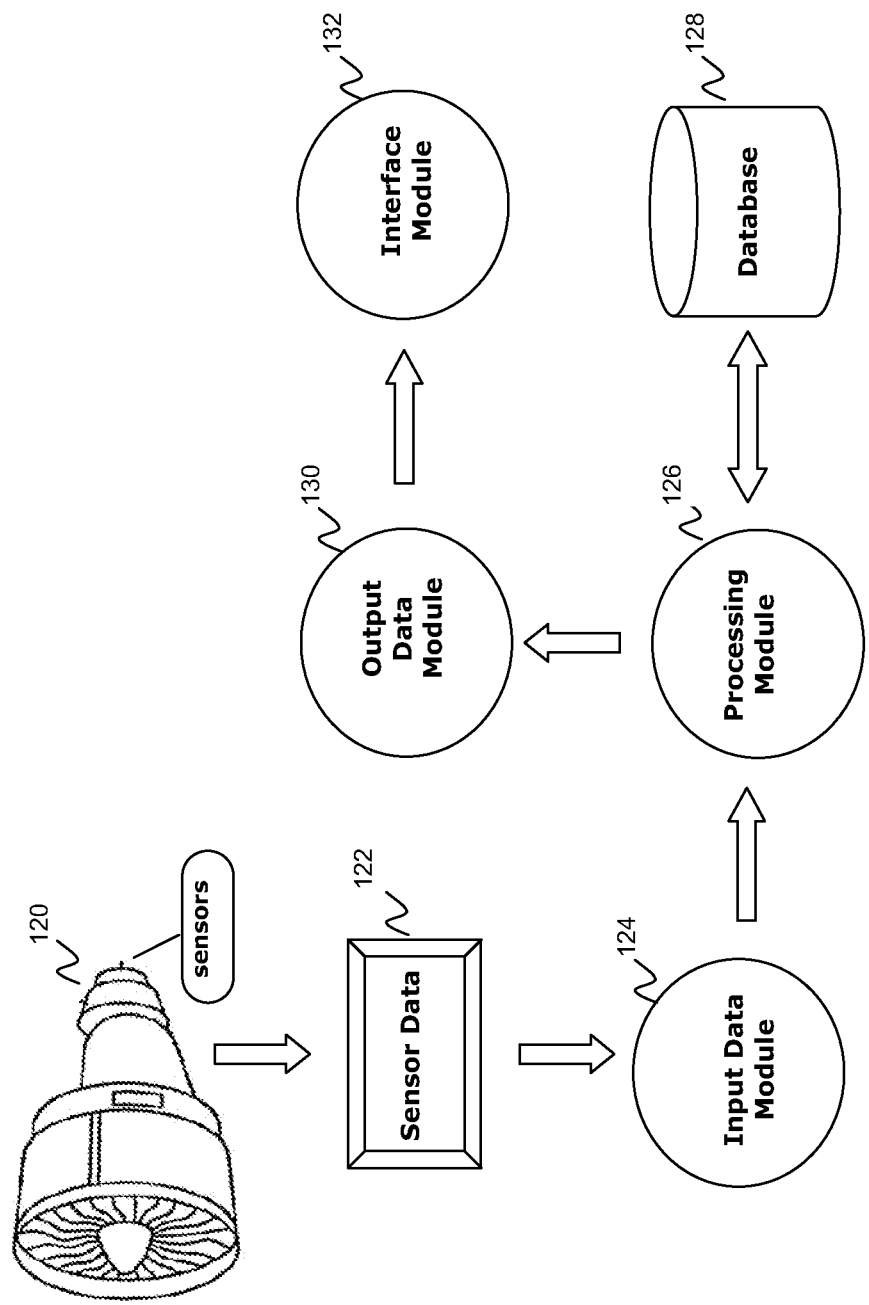
FIG. 8 is a block diagram illustrating certain embodiments of the present system.

FIG. 8 illustrates a system for the detection of blowout precursors in a gas turbine engine combustor. The system includes sensors 120 associated with and/or in communication with at least one turbine engine combustor, which provide sensor data 122, an input data module 124, a processing module 126, a database 128, an output data module 130 and an interface module 132.

In an embodiment, the sensors 120 are configured to generate sensor data 122 representative of the operating condition of the gas turbine engine 120. Sensor data may include, for example, combustion dynamics data and operational data related to the gas turbine engine 120. The input data module 124 may receive sensor data 122 directly from the sensors.

In other embodiments, sensor data may be received by the input data module 124 from another program or system, for example, a Combustion Dynamics Monitoring System or other data acquisition system, or may itself comprise a Combustion Dynamics Monitoring System.

In certain embodiments, Combustion Dynamics Monitoring Systems collect dynamics data in the time domain. Time domain data may comprise pressure oscillations, electromagnetic radiation from the flame (e.g., chemiluminescence or thermal radiation), velocity oscillations, or some other observable related to combustion dynamics. Operational data may also be collected, as discussed above.

In an embodiment, the input data module 124 makes combustion dynamics data and operational data 122 related to the gas turbine engine 120 available to the processing module 126. The processing module 126 is capable of analyzing and processing the data; performing the simplified Mexican Hat wavelet analysis to detect the existence of a blowout precursor. In an illustrative but non-limiting embodiment, the processing module may perform the following operations in accordance with the subject system and method.

Parameters are set, such as sampling frequency, number of combustors, wavelet parameters, wavelet coefficient thresholds, and wavelet duration. Typically, two wavelets will be pre-calculated, referred to as low frequency and high frequency, although the raw data for both will be in the kilohertz range, so two sets of wavelet parameters will be defined.

The number of samples that will be in the wavelet duration is calculated.

Wavelet functions are pre-generated, such as when the code is first run. Execute an explicit, analytical equation with wavelet parameters as inputs and a vector (the wavelet as the output). This is executed twice, once for the "low" frequency wavelet, and once for the "high" frequency wavelet.

Repeat the following sequence of steps each time a new data sample is acquired: Make a data buffer consisting of high speed CDMS data from each combustor, as new data samples are available. The data enter the buffer as first-in, last-out. The buffer vector should be the same length as the wavelet vectors.

For each combustor, multiply each wavelet vector entry by the corresponding data entry and add them all up (wavelet entry 1×data entry 1, plus wavelet entry 2×data entry 2, etc). Do this twice for each combustor, once with the low frequency wavelet, and once with the high frequency wavelet. These are the "wavelet coefficients."

If the low frequency and high frequency wavelet coefficients are both above the wavelet coefficient thresholds for the same combustor at the same time, then produce an LBO signal (warning signal or operative signal) for that combustor.

In an embodiment, the database 128 is configured to store and make available to the processing module 126 data relating to the operating conditions of the turbine engine, including the signals generated by the sensors. In further embodiments, database 128 is configured to store and make available to the processing module 126, historical sensor data associated with the turbine engine and sensors 120, including but not limited to, frequency oscillations and/or wavelet coefficients associated with hiccups and lean blowout events.

The output module 130 may report results identified by the processing module 126 to the interface module 132 for presentation to or notification of the user. The output module 130 may report results to the interface module 132 in raw form or may be configured to perform additional processing of the results identified by the processing module 126.

The interface module 132 may communicate the results reported by the output data module 130. Results may be communicated to a user via an electronic device, a display or printout, or may be utilized for control purposes. In an embodiment, results may be made available in real-time, for real-time monitoring or control, or may be stored and made available for later use. In an aspect of the present disclosure, the output data module 130 may communicate results in the form of an alarm, an audible indicator, email, text message, instant message, social media message, pager notification, or may utilize other communication methods.

In other embodiments, the output data module 130 may forward results to another program or system, for example, a Combustion Dynamics Monitoring System, for further processing or for control purposes. For example, the interface module may generate at least one control signal upon detection of a blowout precursor to adjust a fuel-air ratio of fuel and air supplied to the combustor associated with the blowout precursor. In certain embodiments, the output data module 130 and interface module 132 may be integrated.

In previous practice, it had been necessary to adjust all combustors to avoid LBO, rather than in the present system and method where only the combustor(s) having an LBO issue may be adjusted.

It will be understood that the embodiments described herein are merely exemplary, and that one skilled in the art may make variations and modifications without departing from the spirit and scope of the invention. All such variations and modifications are intended to be included within the scope of the invention as described and claimed herein. Further, all embodiments disclosed are not necessarily in the alternative, as various embodiments of the invention may be combined to provide the desired result.

The invention claimed is:

1. A method for detecting blowout precursors in at least one gas turbine combustor, comprising receiving combustion dynamics acoustic data measured by an acoustic measuring device associated with the combustor in real time; performing wavelet analysis on the acoustic data using a simplified Mexican Hat wavelet transform analysis; and determining the existence of a blowout precursor based at least in part on the wavelet analysis, wherein said determining the existence of a blowout precursor comprises determining an increase in amplitude of time dependent spectral content in at least one predefined band of high frequency dynamics.

2. The method of claim 1, wherein the band of high frequency dynamics is predefined based on an identification of bands of high frequency dynamics that appeared for the combustor approximately one second before a previous blowout event.

3. The method of claim 1, wherein performing the wavelet analysis comprises determining the dominant frequencies of oscillation of an acoustic data signal as a function of time to calculate a wavelet coefficient.

4. The method of claim 3, further comprising using a windowed root-mean-square calculation to process the wavelet coefficient to determine the amplitude of the wavelet coefficient, and determining the existence of a blowout precursor based on an increased amplitude of the wavelet coefficient oscillation.

5. A system for acoustic detection of blowout precursors in at least one gas turbine combustor comprising an acoustic measuring device in communication with the combustor, wherein the acoustic measuring device generates signals indicative of acoustic combustion dynamics in the combustor in real time; and a blowout precursor monitoring unit that receives the acoustic signals and performs a simplified Mexican Hat wavelet transform analysis to detect the existence of a blowout precursor, wherein the blowout precursor monitoring unit detects the existence of a blowout precursor by determining an increase in amplitude of time dependent spectral content in at least one predefined band of high frequency dynamics.

6. The system as in claim 5, further comprising a combustion controller configured to control at least one parameter of the operation of the combustor based at least in part on detection of a blowout precursor by the blowout precursor monitoring unit.

7. The system as in claim 6, wherein the combustion controller is configured to generate at least one control signal upon detection of a blowout precursor to adjust a fuel-air ratio of fuel and air supplied to the combustor associated with the blowout precursor.

8. The system of claim 5, wherein the at least one band of high frequency dynamics is predefined based on an identification of bands of high frequency dynamics that appeared for the combustor approximately one second before a previous blowout event.

9. The system of claim 5, wherein the blowout precursor monitoring unit performs the wavelet analysis by determining the dominant frequencies of oscillation of the acoustic signal as a function of time to calculate a wavelet coefficient.

10. The system of claim 9, wherein the blowout precursor monitoring unit uses a windowed root-mean-square calculation to process the wavelet coefficient to determine the amplitude of the wavelet coefficient, and detects the existence of a blowout precursor based on an increased amplitude of the wavelet coefficient oscillation.

11. The system of claim 5, wherein the blowout precursor monitoring unit, upon detection of a blowout precursor, sends an alarm signal to an electronic device and/or sends a signal indicating the detection of the blowout precursor to a combustion controller.

12. A non-transitory computer-readable storage medium on which is encoded executable program code for performing a method for detecting blowout precursors in at least one gas turbine combustor comprising, receiving combustion dynamics acoustic data measured by an acoustic measuring device associated with the combustor in real time; performing wavelet analysis on the acoustic data using a simplified Mexican Hat wavelet transform analysis; and determining the existence of a blowout precursor based at least in part on the wavelet analysis, wherein said determining the existence of a blowout precursor comprises determining an increase in amplitude of time dependent spectral content in at least one predefined band of high frequency dynamics.

13. The non-transitory computer readable medium of claim 12, wherein the band of high frequency dynamics is predefined based on an identification of bands of high frequency dynamics that appeared for the combustor approximately one second before a previous blowout event.

14. The non-transitory computer readable medium of claim 12, wherein performing the wavelet analysis comprises determining the dominant frequencies of oscillation of an acoustic data signal as a function of time to calculate a wavelet coefficient.

15. The non-transitory computer readable medium of claim 14, wherein the method further comprises using a windowed root-mean-square calculation to process the wavelet coefficient to determine the amplitude of the wavelet coefficient, and determining the existence of a blowout precursor based on an increased amplitude of the wavelet coefficient oscillation.

16. A method for detecting blowout precursors in at least one gas turbine combustor, comprising receiving combustion dynamics acoustic data measured by an acoustic measuring device associated with the combustor in real time; performing wavelet analysis on the acoustic data using a simplified Mexican Hat wavelet transform analysis; and determining the existence of a blowout precursor based at least in part on the wavelet analysis, wherein performing the wavelet analysis comprises determining the dominant frequencies of oscillation of an acoustic data signal as a function of time to calculate a wavelet coefficient.

17. A system for acoustic detection of blowout precursors in at least one gas turbine combustor comprising an acoustic measuring device in communication with the combustor, wherein the acoustic measuring device generates signals indicative of acoustic combustion dynamics in the combustor in real time; and a blowout precursor monitoring unit that receives the acoustic signals and performs a simplified Mexican Hat wavelet transform analysis to detect the existence of a blowout precursor, wherein the blowout precursor monitoring unit performs the wavelet analysis by determining the dominant frequencies of oscillation of the acoustic signal as a function of time to calculate a wavelet coefficient.

18. A non-transitory computer-readable storage medium on which is encoded executable program code for performing a method for detecting blowout precursors in at least one gas turbine combustor comprising, receiving combustion dynamics acoustic data measured by an acoustic measuring device associated with the combustor in real time; performing wavelet analysis on the acoustic data using a simplified Mexican Hat wavelet transform analysis; and determining the existence of a blowout precursor based at least in part on the wavelet analysis, wherein performing the wavelet analysis comprises determining the dominant frequencies of oscillation of an acoustic data signal as a function of time to calculate a wavelet coefficient.

* * * * *